(12) United States Patent
Trouillet-Fonti et al.

(10) Patent No.: US 7,931,959 B2
(45) Date of Patent: Apr. 26, 2011

(54) FIBER-FILLED POLYAMIDE COMPOSITIONS AND MOLDED ARTICLES SHAPED THEREFROM

(75) Inventors: Lise Trouillet-Fonti, Villette-de-Vienne (FR); Marco Amici, Perugia (IT); Christophe Lapierre, Jonage (FR); Gilles Robert, Vernaison (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 12/738,474

(22) PCT Filed: Oct. 17, 2008

(86) PCT No.: PCT/EP2008/064042
§ 371 (c)(1),
(2), (4) Date: Sep. 1, 2010

(87) PCT Pub. No.: WO2009/050269
PCT Pub. Date: Apr. 23, 2009

(65) Prior Publication Data
US 2011/0020594 A1 Jan. 27, 2011

(30) Foreign Application Priority Data
Oct. 19, 2007 (FR) .................................. 07 07326

(51) Int. Cl.
*B32B 27/04* (2006.01)
(52) U.S. Cl. ...................... 428/297.4; 524/606; 524/607
(58) Field of Classification Search ............... 428/297.4; 524/606, 607
See application file for complete search history.

(56) References Cited

U.S. PATENT DOCUMENTS

| | | | | |
|---|---|---|---|---|
| 3,825,516 | A * | 7/1974 | Schneider | 523/323 |
| 4,105,021 | A * | 8/1978 | Williams et al. | 600/496 |
| 5,250,604 | A * | 10/1993 | Moriwaki et al. | 524/494 |
| 6,617,381 | B1 * | 9/2003 | Kumaki et al. | 524/112 |
| 6,706,790 | B1 * | 3/2004 | Berliet | 524/255 |
| 2010/0291388 | A1 * | 11/2010 | Alvarez et al. | 428/407 |
| 2010/0313605 | A1 * | 12/2010 | Soliman et al. | 65/442 |

FOREIGN PATENT DOCUMENTS
WO  WO 97/24388  7/1997

OTHER PUBLICATIONS

Theodore Davidson et al, "Flow Response and Microstructure of Polymers Reinforced With Discontinuous Fibers," *Materials Research Society Symposium Proceedings*, 1993, pp. 231-235, vol. 289, Materials Research Society, Pittsburg, PA.

A. Bernasconi et al., "Effect of Fibre Orientation on the Fatigue Behaviour of a Short Glass Fibre Reinforced Polyamide-6," *International Journal of Fatigue*, 2007, pp. 199-208, vol. 29, Elsevier.

* cited by examiner

*Primary Examiner* — N. Edwards
(74) *Attorney, Agent, or Firm* — Buchanan, Ingersoll Rooney, PC

(57) ABSTRACT

Polyamide compositions filled with fibers have good mechanical and rheological properties, the polyamide having a high fluidity in molten phase and the fibers, in particular glass fibers, being well aligned at both the surface and the core of shaped articles injection molded from such compositions.

22 Claims, 2 Drawing Sheets

FIBER-FILLED POLYAMIDE COMPOSITIONS AND MOLDED ARTICLES SHAPED THEREFROM

CROSS-REFERENCE TO PRIOR APPLICATIONS

This application claims priority under 35 U.S.C. §119 of FR 0707326, filed Oct. 19, 2007, and is a continuation of PCT/EP 2008/064042, filed Oct. 17, 2008 and designating the United States (published in the French language on Apr. 23, 2009, as WO 2009/050269 A1; the title and abstract were also published in English), each hereby expressly incorporated by reference in its entirety and each assigned to the assignee hereof.

The present invention relates to a fiber-filled polyamide composition that has good mechanical and rheological properties. The invention especially relates to a composition comprising at least one polyamide having a high melt flow and fibers, especially glass fibers; and also to a process for the manufacture of such a composition.

PRIOR ART

Among the properties that it is often sought to control for a thermoplastic intended to be formed by techniques such as injection molding, gas-injection molding, extrusion, extrusion-blow molding, mention is made of the stiffness, the impact strength, the dimensional stability, in particular at relatively high temperature, low shrinkage after forming, ability to be painted by various processes, surface appearance, density. These properties may be controlled, within certain limits, by the choice of a polymer or by the addition to the polymer of compounds of various natures. In the latter case, they are referred to as polymer compositions. The choice of a material for a given application is generally guided by the performance level required with respect to certain properties and by its cost. Novel materials are always sought that are capable of corresponding to specifications in terms of performance and/or cost. Polyamide is, for example, a widely used material, especially in the field of the motor vehicle industry.

Polyamide is a polymer which is chemically resistant, which is stable at high temperatures and which may be blended with various types of fillers in order to modify the properties thereof. It is possible, for example, to improve its mechanical properties by adding fibrous fillers.

The Applicant has demonstrated, quite surprisingly, that articles injection molded from conventional polyamide compositions filled with fibers, especially glass fibers, have fibers which are generally well aligned in the direction of the injection in the vicinity of the surface of said articles, but which are much less well aligned at the core of the article relative to the direction of the injection. This positioning of the fibers at the core of said articles causes a certain mechanical brittleness and limits the level of mechanical properties, especially the tensile strength.

There is thus a need to develop a polyamide composition that does not have the drawbacks mentioned previously.

INVENTION

The Applicant has developed polyamide compositions comprising fibers which have a good alignment with respect to the direction of the injection at the surface and also at the core of the articles formed, especially by injection molding. This good alignment of the fibers makes it possible to obtain polyamide articles that have good mechanical properties, especially a very good tensile strength.

The Applicant has thus brought to light polyamide compositions comprising fibers that have quite remarkable mechanical properties on the tensile strength level, and also an increased melt flow. The compositions of the invention also make it possible to produce articles that have an excellent surface appearance, especially when these articles comprise a high filler content. It appears, furthermore, that these compositions are easy to process in forming processes, especially injection molding. Furthermore, it appears that these polyamide-based compositions will result in molded articles being obtained that have a high shrinkage anisotropy, especially due to the orientation of the fillers, such as glass fibers.

The alignment of the fibers in the polyamide compositions according to the invention is measured by a high-resolution X-ray microtomography method on injection-molded test specimens.

One subject of the present invention is thus a composition comprising at least one polyamide matrix and fibers and that enables the manufacture of articles that have a maximum core thickness of less than or equal to 600 μm according to the following test:

a) said composition is injection molded in order to obtain a dumbbell test specimen of type 1A for a tensile test according to the standard ISO 527-2 using a slit aperture gating at the end of the head of the test specimen; the test specimen having the following dimensions: length of 180 mm, working length of 80 mm, working width of 10 mm and thickness of 4 mm; the injection molding being carried out according to the standards ISO 294-1 and ISO 1874-2 by means of a mold with a T-runner comprising two cavities, as described in Annex A—ISO 294-1; with the following characteristics:

an injection-molding press equipped with a standard screw having a diameter of 35 mm for thermoplastics comprising a three-zone profile (feed, compression, homogenization), having an L/d ratio equal to 22 and a compression ratio of 2/1;

injection at a speed of 80 cm$^3$/s;

an injection time of 0.8 s;

b) a cube is cut from the middle of the test specimen and analyzed by high-resolution X-ray microtomography so as to obtain a succession of radiographs and thus reconstruct the 3D volume of the cube;

c) the Euler angles are determined for each fiber in the reconstructed 3D volume of the cube using image analysis software:

σ (theta) corresponds to the angle between a single fiber and its projection in the plane of the test specimen comprising the length and the width of the test specimen;

ρ (phi) corresponds to the angle between the projection of a fiber in the plane of the test specimen and the injection direction;

the value A is then calculated that corresponds to the component a11 of the orientation tensor a2 corresponding to the average value of $\cos^2 \rho \cdot \sin^2 \sigma$ for all of the fibers throughout the thickness of the test specimen, and the values B are also calculated that correspond to the components a11 of the orientation tensor a2 corresponding to the average value of $\cos^2 \rho \cdot \sin^2 \sigma$ for all of the fibers in various slices of the thickness of the test specimen;

d) the maximum core thickness is measured on a graph that represents the values B for each slice of the thickness of the test specimen (total thickness of 4 mm).

The term "skin" is understood to mean the zone situated at the surface of a test specimen for which the value B of the fibers is at its maximum value; that is to say a zone in which the fibers are perfectly or almost perfectly aligned relative to the injection direction.

The term "core" is understood to mean the zone situated at the center of a test specimen for which the value B of the fibers is not at its maximum value; that is to say a zone in which the fibers are less aligned relative to the injection direction with respect to the skin.

The maximum core thickness is a zone in the thickness of the test specimens where the value B drops significantly relative to its value at the skin. It may be considered that the passage from the core to the skin takes place when the value B passes below a value of 0.9. The maximum core thickness is measured on a graph that represents, on the y-axis, the component aII for each slice and, on the x-axis, the various slices considered in the thickness of the test specimen. The maximum thickness corresponds, on the graph, to the distance in micrometers that separates the reduction, then the increase of the component aII in the thickness of the test specimen.

In step a), a calibrated test specimen, prepared under precise injection-molding conditions which are a function of the nature of the polyamide, is thus produced, in order to then carry out an X-ray mapping of a cube removed from the center of the working length of the test specimen.

According to the test explained previously, the injection direction is parallel to the length of the test specimen.

The most important injection parameters of step a) are given above. Mention may also be made of other parameters that a person skilled in the art will be perfectly able to optimize as a function of the nature of the polyamide. Thus, for example, the hold pressure in the mold depends on the dimensions of the part to be molded, on the melt viscosity of the polyamide and on the desired surface appearance. Similarly, the hold time is optimized by a curve of the weight of the part as a function of the time. The cooling time in the mold depends, for example, on the stiffness recovery rate of the polyamide.

As regards the temperature of the barrel and the temperature of the mold, they are those conventionally used for the polyamides used. It is possible, for example, to carry out the injection molding at a barrel temperature of 20° C. above the melting temperature of the polyamide.

During step b), the 3D volume of the cube is obtained by a high-resolution X-ray microtomography analysis that makes it possible to obtain a succession of radiographs.

High-resolution X-ray microtomography is a non-destructive technique that enables "cross-sectional" images of a three-dimensional object to be reconstructed. It shows all the characteristics of the microstructure, such as the presence of various phases, inclusions, cracks, or pores, that modify the attenuation coefficient or the optical index along the path taken by an X-ray beam in the material.

Microtomography is a tomography technique that has a resolution of the order of one micrometer, in particular below 2.5 µm.

Its principle is based on the multidirectional analysis of the interaction of a beam of X-rays with the material, by recording, via detectors, the radiation transmitted after having passed through an object.

The data acquired during the measurement, the duration of which varies from a fraction of seconds to a few hours depending on the installation, are collected along multiple orientations, the number and the pitch of which are a function of the type of machine and of the resolution. Using this data, a digital image is calculated and reconstructed mathematically, using reconstruction algorithms, as a gray scale or color scale, each shade of which expresses, pixel by pixel, the local attenuation coefficient of the incident beam. This, after calibration and standardization, may be expressed as a density scale.

X-ray microtomography therefore makes it possible to access the core of the material in order to assess the variations of radiological absorptions and the differences of composition therein. It also makes it possible to very finely locate the fibers in the volume of a polyamide composition.

Such a technique may be implemented by using a third-generation synchrotron, especially at the ESRF (European Synchrotron Radiation Facility). The term synchrotron denotes a large electromagnetic instrument intended for the high-energy acceleration of electrons.

Various devices may be used for acquiring radiographs at various angles. They are all provided with a source of X rays, a rotating platform to which the object is fastened and a X-ray detector. The simplest solution for digitizing images is to use a 2D fluoroscopic detector which converts the X rays to visible light, then to transfer, via an appropriate optical system, the flux of light to a CCD (charge-coupled device) camera. The whole of the tomographic device must be carefully calibrated, especially the adaptation of the size and of the microstructure of the test specimen relative to the resolution of the system, the knowledge of the position of the axis of rotation of the sample, the number of projections used to reconstruct the volume, etc.

It is possible to use, for example, in step c) a 3D image analysis software, such as for example Visilog, ImageJ, or Aphélion. As explained previously, this step aims to determine the component aII which corresponds to the probability that a set of fibers is oriented in the injection direction.

Preferably, the component aII is calculated as a function of the position of the fibers in the total thickness of the test specimen (value A) and for each 100 µm slice made in the thickness of the test specimen (values B).

In step d), the component aII is reconstructed as a function of the total thickness of the test specimen, which is 4 mm, taking into account the size of the sampled cube and the resolution of the microtomography technique. It is thus possible, for example, to make the measurements on a cube having sides of 2 mm and to transfer the values to a total thickness of 4 mm.

The polyamide of the invention is especially selected from the group consisting of the polyamides obtained by polycondensation of at least one aliphatic dicarboxylic acid with an aliphatic or cyclic diamine, such as PA-6,6, PA-6,10, PA-6,12, PA-12,12, PA-4,6 or MXD-6, or between at least one aromatic dicarboxylic acid and an aliphatic or aromatic diamine, such as poly-terephthalamides, polyisophthalamides or polyaramids, or their blend and (co)polyamides. The polyamide of the invention may also be selected from the polyamides obtained by polycondensation of at least one amino acid or lactam with itself, the amino acid possibly being generated by hydrolytic opening of a lactam ring such as, for example, PA-6, PA-7, PA-11 or PA-12, or their blend and (co)polyamides. As a type of copolyamide, mention may especially be made of the polyamide PA-6/6,6.

Polyamides of PA-6 type and polyamides of PA-6,6 type are particularly preferred. A polyamide of PA-6 type is understood to mean a polyamide comprising at least 90% by weight of residues of caprolactam or aminocaproic monomers. A polyamide of PA-6,6 type is understood to mean a polyamide comprising at least 90% by weight of residues of adipic acid and hexamethylenediamine monomers.

According to one preferred embodiment of the invention, use is made of polyamides that have an apparent melt viscosity between 10 and 80 Pa·s, especially between 15 and 60 Pa·s, more preferably still between 20 and 40 Pa·s, measured according to standard ISO 11443 at a shear rate of 1000 s$^{-1}$ and a temperature 20° C. above the melting temperature $T_m$ of the polymer measured according to the standard ISO 11357-3. Such polyamides make it possible to obtain optimum properties by ensuring a maximum core thickness in accordance with the present invention.

Polyamides of high fluidity may especially be obtained by controlling their molecular weight during their synthesis, and therefore their melt flow, especially by addition before or during the polymerization of the polyamide monomers, especially the monomers for the manufacture of a polyamide of type PA-6 and/or PA-6,6, of monomers that modify the length of the chains, such as, in particular, difunctional and/or monofunctional compounds having amine or carboxylic acid functional groups capable of reacting with the monomers of the polyamide.

The expression "carboxylic acid" is understood to mean carboxylic acids and derivatives thereof, such as acid anhydrides, acid chlorides and esters, for example. The term "amine" is understood to mean amines and derivatives thereof capable of forming an amide bond.

The difunctional compounds may have the same amine or carboxylic acid functionality, or different functional groups. The amine functional groups may be primary and/or secondary amine functional groups.

It is also possible to use an excess of adipic acid or an excess of hexamethylenediamine for the production of a polyamide of type PA-6,6 having a high melt flow.

It is possible to use, at the start, during or at the end of the polymerization all types of aliphatic or aromatic monocarboxylic or dicarboxylic acids, or all types of aliphatic or aromatic monoamine or diamine amines. Use may especially be made, as a monofunctional compound, of n-dodecylamine and 4-amino-2,2,6,6-tetramethylpiperidine, acetic acid, lauric acid, benzylamine, benzoic acid and propionic acid. Use may especially be made, as a difunctional compound, of adipic acid, terephthalic acid, isophthalic acid, sebacic acid, azelaic acid, dodecanedioic acid, decanedioic acid, pimelic acid, suberic acid, fatty acid dimers, di(β-ethylcarboxy)cyclohexanone, hexa-methylenediamine, 5-methylpentamethylenediamine, meta-xylylenediamine, butanediamine, isophoronediamine, 1,4-diaminocyclohexane and 3,3',5-trimethylhexamethylene-diamine.

Use may very particularly be made of a polyamide of type PA-6,6, that is to say a polyamide obtained at least from adipic acid and hexamethylenediamine or salts thereof such as hexamethylenediamine adipate, which may optionally comprise other polyamide monomers. Use may especially be made, as polyamide, of a polyamide of type PA-6,6 obtained by addition, during polymerization, of an excess of hexamethylenediamine and of acetic acid or a polyamide of type PA-6,6 obtained by addition, during polymerization, of acetic acid.

The polyamide according to the invention may have a molecular weight $M_n$ between 3000 and 17 000 g/mol, preferably between 11 000 and 17 000, more preferably between 11 000 and 15 000 and more preferably still between 12 000 and 14 500.

It may also have a polydispersity index ($D=M_w/M_n$) of less than or equal to 2.

Polyamides according to the invention may also be obtained by blending, especially melt blending. It is possible, for example, to blend one polyamide with another polyamide, or one polyamide with a polyamide oligomer, or else one polyamide with monomers that modify the length of the chains, such as, in particular, diamines, dicarboxylic acids, monoamines and/or monocarboxylic acids. It is possible, in particular, to add isophthalic acid or benzoic acid, for example at contents of around 0.2 to 1% by weight, to the polyamide.

The composition of the invention may also comprise copolyamides derived, in particular, from the above polyamides, or blends of these polyamides or (co)polyamides.

Use may especially be made of branched polyamides of high fluidity, especially obtained by blending, during polymerization, in the presence of the polyamide monomers, at least one polyfunctional compound comprising at least three identical reactive functional groups of amine functional group or carboxylic acid functional group type.

It is also possible to use, as a polyamide of high fluidity, a star polyamide comprising star macromolecular chains and, where appropriate, linear macromolecular chains. The polymers comprising such star macromolecular chains are, for example, described in documents WO 97/24388 and WO 99/64496.

These star polyamides are especially obtained by blending, during polymerization, in the presence of polyamide monomers, an amino acid or lactam such as caprolactam, with at least one polyfunctional compound comprising at least three identical reactive functional groups of amine functional group or carboxylic acid functional group type. The expression "carboxylic acid" is understood to mean carboxylic acids and derivatives thereof, such as acid anhydrides, acid chlorides and esters, for example. The term "amine" is understood to mean amines and derivatives thereof capable of forming an amide bond.

Preferably, the polyfunctional compounds are selected from the group consisting of: 2,2,6,6-tetrakis(β-carboxyethyl)cyclohexanone, trimesic acid, 2,4,6-tri(aminocaproic acid)-1,3,5-triazine (TACT) and 4-aminoethyl-1,8-octanediamine, bishexamethylenetriamine, diaminopropane-N,N,N'N'-tetraacetic acid, 3,5,3',5'-biphenyltetracarboxylic acid, acids derived from phthalocyanin and from naphthalocyanine, 3,5,3',5'-biphenyltetracarboxylic acid, 1,3,5,7-naphthalenetetra-carboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridine-tetracarboxylic acid, trimesic acid, 1,2,4,5-benzene-tetracarboxylic acid, diethylenetriamine, trialkylene-tetramines and tetraalkylene-pentamines, the alkylene preferably being ethylene, melamine, and polyalkylene-amines, such as for example the Jeffamine T® compounds from Huntsman, especially Jeffamine T403® (polyoxy-propylenetriamine).

The composition according to the invention may comprise between 20 and 80% by weight, preferably between 20 and 60% by weight, and more preferably between 35 and 55% by weight of polyamide, relative to the total weight of the composition.

The polymerization of the polyamide of the invention is especially carried out according to the conventional operating conditions for polymerization of polyamides, in continuous mode or batch mode.

Such a polymerization process may comprise, briefly:
heating the blend of polyamide monomers, and optionally of polyfunctional, difunctional and/or monofunctional compounds, with stirring and under pressure;
holding the blend under pressure and temperature for a given time, with removal of water vapor via a suitable device, then depressurization and holding for a given time at a temperature above the melting point of the blend, especially under autogenous pressure of water vapor, under nitrogen or under vacuum, in order thus to continue the polymerization by removal of the water formed.

At the end of polymerization, the polymer can be cooled, advantageously with water, and extruded in the form of rods. These rods are cut up in order to produce granules.

As injection-molding parameters for step a) of the test mentioned previously, use may be made of the following characteristics for a polyamide of PA-6,6 type:
- an injection molding press equipped with a standard screw having a diameter of 35 mm, an L/d ratio equal to 22 and a compression ratio of 2/1;
- a barrel temperature between 270 and 290° C., with increasing profile;
- a mold of T type, according to the standard ISO 294-1 Annex A, comprising two cavities at a temperature of 120° C.;
- injection at a speed of 80 cm$^3$/s and a total injected volume of 40 cm$^3$, with a cushion of around 5-7 cm$^3$;
- a specific maximum injection pressure of 1300 bar, a specific packing pressure (or second pressure) of 450 bar, and a specific back pressure of 100 bar;
- a screw rotation speed of 80 rpm; and
- an injection time of 0.8 s, a packing time of 9 s, a cooling time of 12 s, a plasticization time of 8 s and a total cycle time of 32 s.

As injection-molding parameters for step a) of the test mentioned previously, use may be made of the following characteristics for a polyamide of PA-6 type:
- an injection molding press equipped with a standard screw having a diameter of 35 mm, an L/d ratio equal to 22 and a compression ratio of 2/1;
- a barrel temperature between 240 and 250° C., with increasing profile;
- a mold of T type, according to the standard ISO 294-1 Annex A, comprising two cavities at a temperature of 120° C.;
- injection at a speed of 80 cm$^3$/s and a total injected volume of 40 cm$^3$, with a cushion of around 5-7 cm$^3$;
- a specific maximum injection pressure of 1300 bar, a specific packing pressure (or second pressure) of 450 bar, and a specific back pressure of 100 bar;
- a screw rotation speed of 80 rpm; and
- an injection time of 0.8 s, a packing time of 9 s, a cooling time of 12 s, a plasticization time of 8 s and a total cycle time of 32 s.

As fibers, use is preferably made of fibrous fillers of mineral type, such as glass fibers or carbon fibers, or organic fibers, such as for example synthetic fibers such as aramid or polyester fibers, or natural fibers, such as hemp or linen.

In particular, the use of reinforcing fibers, such as glass fibers, is preferred. Preferably, the most widely used fiber is glass fiber, of the chopped type, having a diameter between 7 and 14 µm, preferably of 10 to 14 µm. The chopped glass fibers have, in particular, a length of less than 5 mm, especially between 0.1 and mm. These fillers may have a surface size that ensures the mechanical adhesion between the fibers and the polyamide matrix, especially under critical environmental conditions, such as for example in contact with engine fluids.

The composition may especially comprise from 20 to 80% by weight of fibers, more preferably from 40 to 80% by weight of fibers, and more preferably still from 45 to 65% by weight, relative to the total weight of the composition.

The composition may also comprise non-fibrous fillers, such as particulate fillers, lamellar fillers and/or exfoliable or non-exfoliable nanofillers such as alumina, carbon black, clays, zirconium phosphate, kaolin, calcium carbonate, copper, diatomaceous earths, graphite, mica, silica, titanium dioxide, zeolites, talc, wollastonite, polymeric fillers such as, for example, dimethacrylate particles, beads of glass or glass powder.

The composition according to the invention may or may not comprise impact modifiers, especially those having an elastomeric base comprising functional groups that are reactive with the polyamide.

The composition may comprise, besides the modified polyamide of the invention, one or more other polymers, preferably polyamides or copolyamides.

The composition according to the invention may also comprise additives customarily used for the manufacture of polyamide compositions. Thus, mention may be made of lubricants, flame retardants, plasticizers, nucleating agents, catalysts, light and/or heat stabilizers, antioxidants, antistatic agents, dyes, matifying agents, molding aids or other conventional additives.

These fillers and additives may be added to the modified polyamide via standard means suitable for each filler or additive, such as for example during the polymerization or by melt blending.

The polyamide compositions are generally obtained by cold blending or melt blending of the various compounds that are incorporated into the composition, especially the polyamide and the fibers. It is carried out at a higher or lower temperature and at a higher or lower shear stress depending on the nature of the various compounds. The compounds may be introduced simultaneously or successively. Generally, an extrusion device is used in which the material is heated, then melted and subjected to a shear stress, and transported. Such devices are fully known to a person skilled in the art.

According to a first embodiment, all the compounds are melt blended during a single operation, for example during an extrusion operation. It is possible, for example, to carry out a blending of granules of the polymer materials, introduce them into the extrusion device in order to melt them and subject them to a greater or lesser shear.

It is possible, according to particular embodiments, to produce molten or non-molten premixes of some of the compounds before preparation of the final composition.

The composition according to the invention, when it is prepared using an extrusion device, is preferably packaged in the form of granules. The granules are intended to be formed using processes that involve melting in order to obtain articles. The articles are thus constituted of the composition. According to one customary embodiment, the modified polyamide is extruded in the form of rods, for example in a twin-screw extrusion device, which rods are then cut up into granules. The molded parts are then produced by melting the granules produced above and feeding the composition in the melt state into forming devices, especially injection-molding devices.

The composition according to the invention may be used for any plastic-forming process, such as for example the process of molding, especially injection molding, extrusion, extrusion-blow molding or else rotomolding.

The present invention relates, in particular, to an injection-molding process in which a composition according to the invention is introduced into an injection-molding device and the molding operation is carried out.

Said process may especially be carried out in the absence, or else in the presence, of a supercritical fluid in order to produce microcellular articles.

The present invention also relates to articles obtained from the composition according to the invention.

The use of the compositions according to the invention is particularly advantageous within the context of the manufacture of articles for the motor vehicle or electrical industry, such as for example car fenders, circuit breakers or protective covers.

The difference in distribution of the fibers in dumbbell-type test specimens according to the invention is also observed in other geometries of parts; thus enabling these parts to exhibit better mechanical properties.

The granules according to the invention obtained as described previously comprise, in particular, fibers having an average length between 20 µm and 2 mm. The articles according to the invention, obtained as described previously, especially by injection molding, comprise fibers that have an average length between 20 µm and 500 µm.

Specific terms are used in the description so as to facilitate the understanding of the principle of the invention. It should nevertheless be understood that no limitation of the scope of the invention is envisaged by the use of these specific terms. The term "and/or" includes the meanings and, or, and also all the other possible combinations of the elements connected to this term.

Other details or advantages of the invention will appear more clearly in light of the examples below, given solely by way of indication.

EXPERIMENTAL SECTION

The compounds used are the following:

PA1: Polyamide 6,6 having an MFI of 4.5 g/10 min (according to the standard ISO 1133 measured at 275° C., under a load of 325 g) and a VI of 135 ml/g according to the standard ISO 307. Contents of terminal amine groups (TAG) and terminal carboxylic acid groups (TCG) determined by potentiometric assays after dissolution of the polyamide (one method is, for example, described in "Encyclopedia of Industrial Chemical Analysis", volume 17, page 293, 1973): TAG=50 meq/kg, TCG=80 meq/kg. The apparent melt viscosity according to the standard ISO 11443, measured at 285° C. ($T_m$+20° C.) and at 1000 s$^{-1}$, is 120 Pa·s.

PA2: Polyamide 6,6 having an MFI of 30 g/10 min and a VI of 98 ml/g. Contents of the following terminal groups: TAG=30 meq/kg, TCG=93 meq/kg. Obtained by addition, at the start of polymerization, of 0.5 mol % of acetic acid. The apparent melt viscosity, according to the standard ISO 11443, measured at 285° C. ($T_m$+20° C.) and at 1000 s$^{-1}$, is 30 Pa·s.

PA3: Polyamide 6,6 having an MFI of 27 g/10 min and a VI of 101 ml/g. Contents of the following terminal groups: TAG=50 meq/kg, TCG=65 meq/kg. Obtained by addition, at the start of polymerization, of 0.6 mol % of acetic acid and 0.4 mol % of hexamethylenediamine. The apparent melt viscosity, according to the standard ISO 11443, measured at 285° C. ($T_m$+20° C.) and at 1000 s$^{-1}$, is 34 Pa·s.

Glass fibers: Vetrotex 995.

Heat stabilizer: CuI and KI (respectively, <0.02% and <0.1%) by weight fraction.

Additive: EBS wax, and nigrosine sold under the name 54/1033 by Ferroplast.

The compositions are prepared by melt blending, using a twin-screw extruder of WERNER and PFLEIDERER ZSK type, polyamides, 50% by weight of glass fibers and 1.5% by weight of additives. The extrusion conditions are the following: temperature: between 240 and 280° C.; rotation speed: between 200 and 300 rpm; throughput: between 25 and 60 kg/h.

The tensile strength is measured according to the standard ISO 527 on dumbbell test specimens of 1A type for tensile tests as defined in the standard ISO 527-2. The test specimens have the following dimensions: length of 180 mm, working length of 80 mm, total width of 20 mm, working width of 10 mm and thickness of 4 mm.

Said composition is injection molded in order to obtain a dumbbell test specimen of 1A type for tensile tests according to the standard ISO 527-2 by using a slit aperture gating at the end of the head of the test specimen; the test specimen having the following dimensions: length of 180 mm, working length of 80 mm, total width of 20 mm, working width of 10 mm and thickness of 4 mm; the injection molding being carried out according to the standards ISO 294-1 and ISO 1874-2; with the following characteristics:

- a Demag Ergotech Viva 50T injection molding press equipped with a standard screw having a diameter of 35 mm, an L/d ratio equal to 22 and a compression ratio of 2/1;
- a barrel temperature between 270 and 290° C., with increasing profile;
- a mold of T type, according to the standard ISO 294-1 Annex A, comprising two cavities at a temperature of 120° C.;
- injection at a speed of 80 cm$^3$/s and a total injected volume of 40 cm$^3$, with a cushion of around 5-7 cm$^3$;
- a specific maximum injection pressure of 1300 bar, a specific packing pressure (or second pressure) of 450 bar, and a specific back pressure of 100 bar;
- a screw rotation speed of 80 rpm; and
- an injection time of 0.8 s, a packing time of 9 s, a cooling time of 12 s, a plasticization time of 8 s and a total cycle time of 32 s.

The orientation measurements of the glass fibers are carried out by microtomography, carried out at the ESRF in Grenoble, France on the ID19 line with a spatial resolution of 1.4 µm on cubes of 2 mm cut from the center of the dumbbell test specimens.

Each fiber is characterized in space by its Euler angles ρ (phi) and σ (theta). The orientation of the fibers is characterized, for each 100 µm slice obtained from the thickness, by an orientation tensor of the order of 2 a2, the first component all of which (value B) corresponds to the average value of $\cos^2(\rho)\cdot\sin^2(\sigma)$ for all of the fibers; that is to say the probability that the glass fibers are aligned in the injection direction in the slice of thickness considered. The orientation of the fibers is also characterized for the total thickness of the test specimen by an orientation tensor of the order 2 a2, the first component all of which (value A) corresponds to the average value of $\cos^2(\rho)\cdot\sin^2(\sigma)$ for all of the fibers; that is to say the probability that the glass fibers are aligned in the injection direction in the total thickness of the test specimen.

The maximum core thickness of the test specimens is then measured on a graph representing all for each 100 µm slice (value B) as a function of the position of the slice in the thickness of the test specimen; in total 4 mm.

Figure 1:
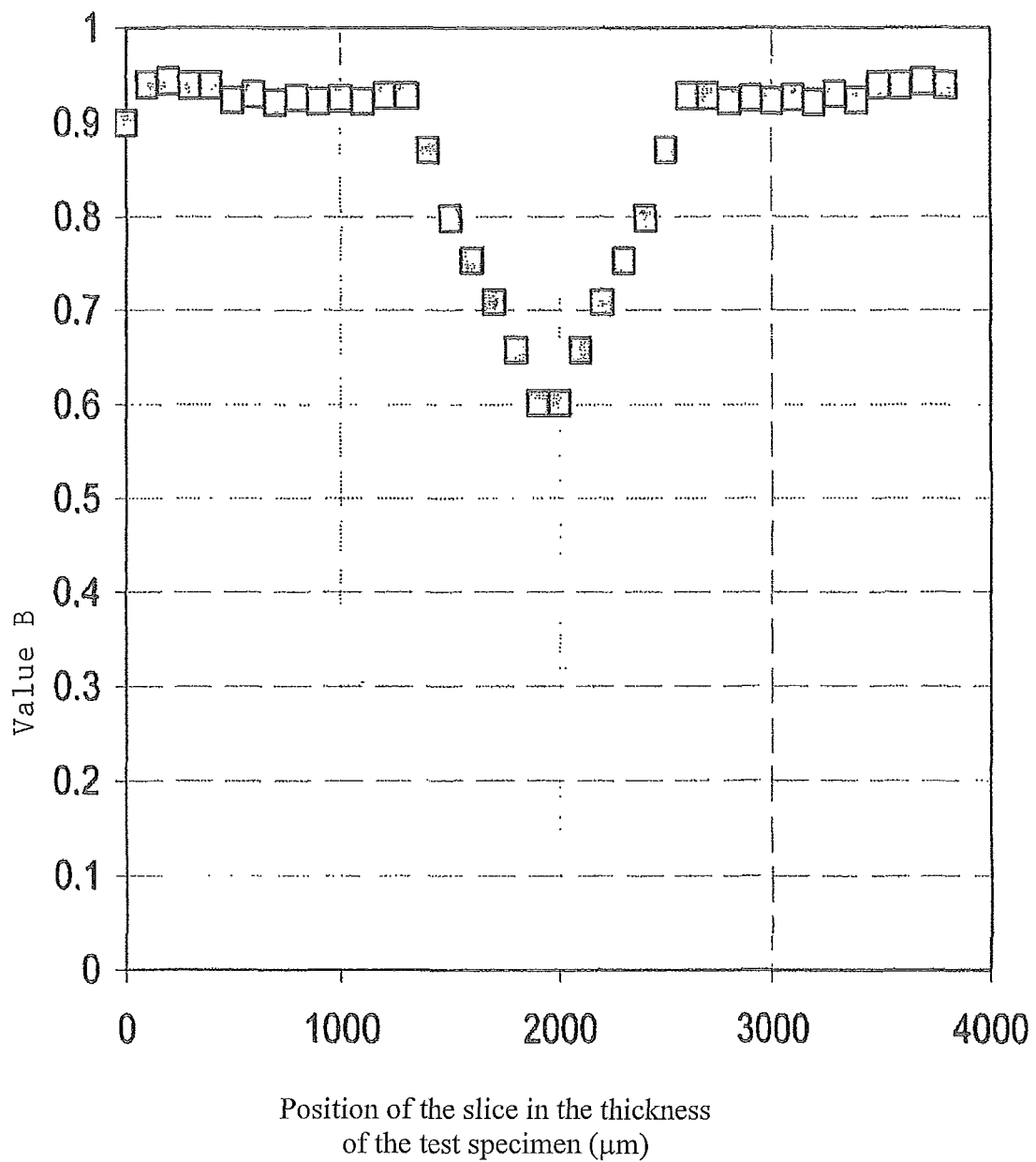
FIG. 1 represents the value B for each 100 µm slice as a function of the position of the slice in the thickness of the test specimen, for the composition C1.
Figure 2:
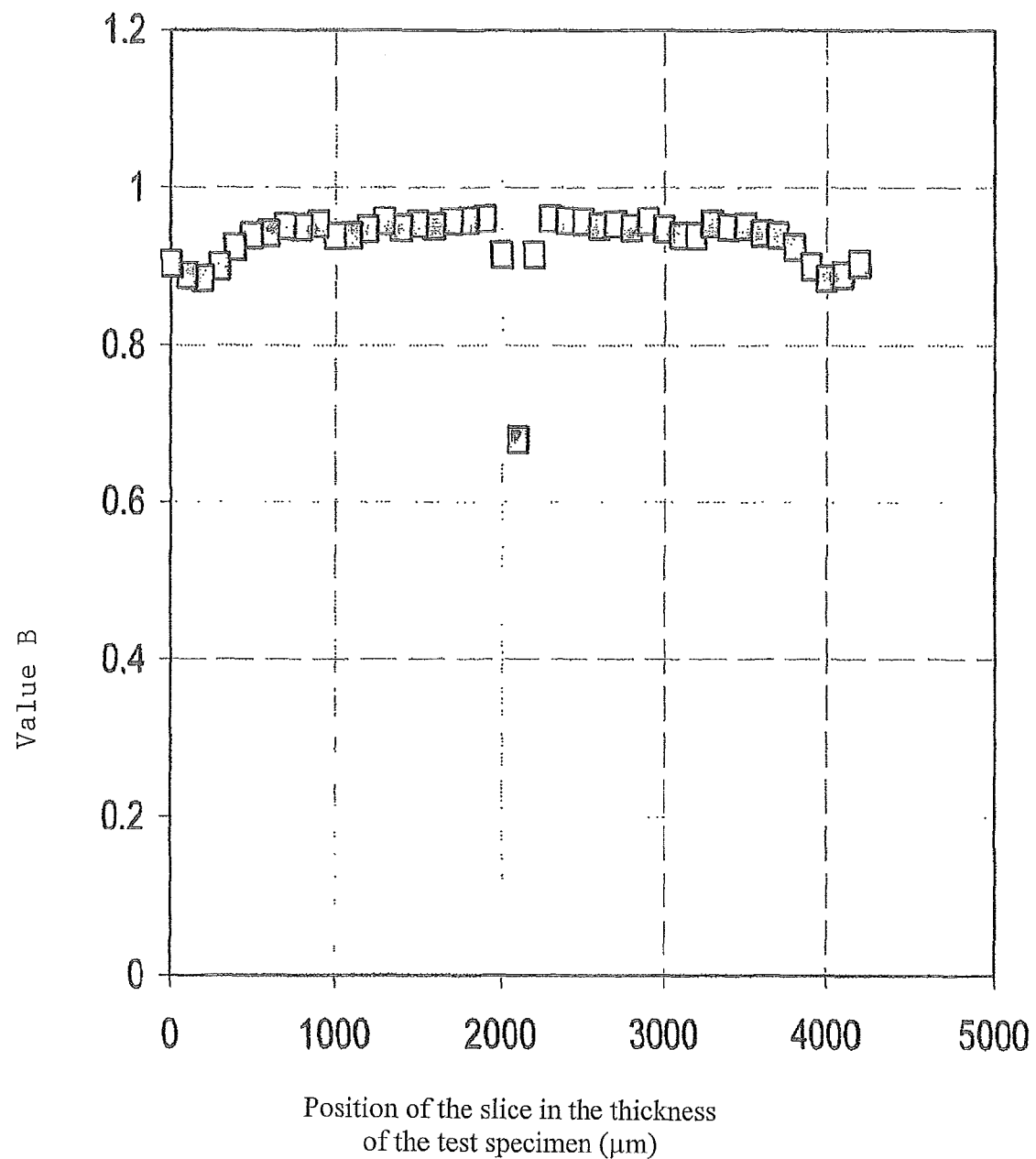
FIG. 2 represents the value B for each 100 μm slice as a function of the position of the slice in the thickness of the test specimen, for the composition 2.

The spiral test makes it possible to quantify the fluidity of the compositions by melting the granules and by injecting them into a spiral-shaped mold having a rectangular cross section with a thickness of 2 mm and a width of 4 cm, in a BM-Biraghi 85T press at a barrel temperature of 275° C., a mold temperature of 80° C. and with a maximum injection pressure of 130 bar, which corresponds to an injection time of around 0.4 seconds. The result is expressed as the length of mold correctly filled by the composition.

The melting temperature is measured according to the standard ISO 11357-3 ("METTLER DSC 20" DSC, with a temperature rise of 10° C./min).

The capillary rheometer analysis was carried out according to the standard ISO 11443 on dry granules using a GÖTTFERT RHEOGRAPH 2002 rheometer, with, in particular, a transducer of 1000 bar, a Roundhole type capillary of 30 mm×1 mm in diameter, with a piston of 12 mm in diameter and a speed (mm/s): 0.01; 0.02; 0.05; 0.1; 0.2; 0.5; 1.0; 2.0; 5.0.

The results are given in table 1:

TABLE 1

| Compositions | C1 | 1 | 2 |
|---|---|---|---|
| PA 1 | 48.5 | | |
| PA 2 | | 48.5 | |
| PA 3 | | | 48.5 |
| Different additives (CuI, KI, wax, nigrosine, etc.) | 1.5 | 1.5 | 1.5 |
| Glass fibers | 50 | 50 | 50 |
| Total | 100 | 100 | 100 |
| Ash content ISO 3451/1A 30 min at 750° C. (%) | 49.8 | 50.1 | 50.1 |
| VI ISO 307 (ml/g) | 135 | 98 | 101 |
| Melting point ISO 11357-3 (° C.) | 263.8 | 264.3 | 265.63 |
| Crystallization temperature ISO 11357-3 (° C.) | 223.5 | 225.5 | 225.28 |
| Notched Charpy impact strength ISO 179/1eA (kJ/m$^2$) | 13.6 | 14.1 | 14.3 |
| Unnotched Charpy impact strength ISO 179/1eU (kJ/m$^2$) | 95.6 | 101.3 | 103.2 |
| Unnotched Charpy impact strength ISO 179/1eU (kJ/m$^2$) after 1000 hours at 150° C. | 53.5 | 61.2 | 57.9 |
| Tensile strength ISO 527 (N/mm$^2$) | 223 | 251 | 248 |
| Tensile elongation ISO 527 (%) | 2.8 | 2.8 | 2.9 |
| Tensile modulus ISO 527 (N/mm$^2$) | 16.6 | 16.8 | 16.9 |
| Spiral test (cm) | 19 | 27 | 25 |
| Thickness of the "core" of the dumbbell bars (μm) | 1200 | 400 | 500 |
| Value A | 0.89 | 0.94 | 0.93 |
| Average length of the glass fibers (μm) ± standard deviation | 200 ± 106 | 198 ± 118 | 215 ± 125 |
| Surface appearance | bad | good | good |

It is thus observed that materials 1 and 2 have a smaller test specimen core and glass fibers that are more aligned in the direction of the injection, and also a tensile strength that is much higher compared to the comparative test.

It should be noted that the average length of the glass fibers is, statistically, the same for all three materials, therefore this parameter cannot explain the observed difference in the mechanical properties.

The invention claimed is:

1. A thermoplastic polymer composition comprising at least one enhanced melt flow polyamide matrix and fibrous filler material that can be shaped into articles having a maximum core thickness of less than or equal to 600 μm according to the following test:
   a) injection molding said composition to obtain a dumbbell test specimen of type 1A for a tensile test according to the standard ISO 527-2 employing a slit aperture gating at the end of the head of the test specimen; the test specimen having the following dimensions: length of 180 mm, working length of 80 mm, working width of 10 mm and thickness of 4 mm; the injection molding being carried out according to the standards ISO 294-1 and ISO 1874-2 by means of a mold with a T-runner comprising two cavities, as described in Annex A—ISO 294-1; with the following characteristics:
      an injection-molding press equipped with a standard screw having a diameter of 35 mm for thermoplastics comprising a three-zone profile (feed, compression, homogenization), having an L/d ratio equal to 22 and a compression ratio of 2/1;
      injection at a speed of 80 cm$^3$/s;
      an injection time of 0.8 s;
   b) cutting a cube from the middle of the test specimen and analyzed by high-resolution X-ray microtomography to obtain a succession of radiographs and thus reconstruct the 3D volume of the cube;
   c) the Euler angles are determined for each fiber in the reconstructed 3D volume of the cube using image analysis software:
      σ(theta) corresponds to the angle between a single fiber and its projection in the plane of the test specimen comprising the length and the width of the test specimen;
      ρ(phi) corresponds to the angle between the projection of a fiber in the plane of the test specimen and the injection direction;
      the value A is then calculated that corresponds to the component a11 of the orientation tensor a2 corresponding to the average value of $\cos^2 \rho \cdot \sin^2 \sigma$ for all of the fibers throughout the thickness of the test specimen, and
      the values B are also calculated that correspond to the components a11 of the orientation tensor a2 corresponding to the average value of $\cos^2 \rho \cdot \sin^2 \sigma$ for all of the fibers in various slices of the thickness of the test specimen;
   d) the maximum core thickness is measured on a graph that represents the values B for each slice of the thickness of the test specimen (total thickness of 4 mm).

2. The thermoplastic polymer composition as defined by claim 1, wherein the at least one polyamide is selected from the group consisting of the polyamides obtained by polycondensation of at least one aliphatic dicarboxylic acid with an aliphatic or cyclic diamine; or between at least one aromatic dicarboxylic acid and an aliphatic or aromatic diamine.

3. The thermoplastic polymer composition as defined by claim 1, wherein the at least one polyamide is selected from the group consisting of the polyamides obtained by polycondensation of at least one amino acid or lactam.

4. The thermoplastic polymer composition as defined by claim 1, wherein the at least one polyamide comprises a PA-6 polyamide or a PA-6,6 polyamide.

5. The thermoplastic polymer composition as defined by claim 1, wherein the at least one polyamide has an apparent melt viscosity from 10 to 80 Pa·s, measured according to standard ISO 11443 at a shear rate of 1000 s$^{-1}$ and a temperature 20° C. above the melting temperature $T_m$ of the polymer measured according to the standard ISO 11357-3.

6. The thermoplastic polymer composition as defined by claim 1, wherein the at least one polyamide has a molecular weight $M_n$ from 3,000 to 17,000 g/mol.

7. The thermoplastic polymer composition as defined by claim 1, wherein the at least one polyamide is obtained by addition, before or during the polymerization of the polyamide monomers, of monomers that modify the length of the chains selected from among difunctional and/or monofunctional compounds having amine or carboxylic acid functional groups capable of reacting with the monomers of the polyamide.

8. The thermoplastic polymer composition as defined by claim 1, wherein the at least one polyamide is obtained by blending one polyamide with another polyamide, or one polyamide with one polyamide oligomer, or else one polyamide with monomers that modify the length of the polymer chains.

9. The thermoplastic polymer composition as defined by claim 1, wherein the at least one polyamide is obtained by blending, during polymerization, in the presence of polyamide monomers, of at least one polyfunctional compound comprising at least three identical reactive functional groups of amine functional group or carboxylic acid functional group type.

10. The thermoplastic polymer composition as defined by claim 1, comprising from 20% to 80% by weight of said at least one polyamide, relative to the total weight of the composition.

11. The thermoplastic polymer composition as defined by claim 1, wherein the parameters for the injection molding for step a) are the following for a PA-6,6 polyamide:
- an injection molding press equipped with a standard screw having a diameter of 35 mm, an L/d ratio equal to 22 and a compression ratio of 2/1;
- a barrel temperature from 270 to 290° C., with increasing profile;
- a mold of T type, according to the standard ISO 294-1 Annex A, comprising two cavities at a temperature of 120° C.;
- injection at a speed of 80 cm$^3$/s and a total injected volume of 40 cm$^3$, with a cushion of around 5-7 cm$^3$;
- a specific maximum injection pressure of 1300 bar, a specific packing pressure (or second pressure) of 450 bar, and a specific back pressure of 100 bar;
- a screw rotation speed of 80 rpm; and
- an injection time of 0.8 s, a packing time of 9 s, a cooling time of 12 s, a plasticization time of 8 s and a total cycle time of 32 s.

12. The thermoplastic polymer composition as defined by claim 1, wherein the injection-molding parameters for step a) are the following for a PA-6 polyamide:
- an injection molding press equipped with a standard screw having a diameter of 35 mm, an L/d ratio equal to 22 and a compression ratio of 2/1;
- a barrel temperature from 240 to 250° C., with increasing profile;
- a mold of T type, according to the standard ISO 294-1 Annex A, comprising two cavities at a temperature of 120° C.;
- injection at a speed of 80 cm$^3$/s and a total injected volume of 40 cm$^3$, with a cushion of around 5-7 cm$^3$;
- a specific maximum injection pressure of 1300 bar, a specific packing pressure (or second pressure) of 450 bar, and a specific back pressure of 100 bar;
- a screw rotation speed of 80 rpm; and
- an injection time of 0.8 s, a packing time of 9 s, a cooling time of 12 s, a plasticization time of 8 s and a total cycle time of 32 s.

13. The thermoplastic polymer composition as defined by claim 1, said fibrous filler material comprising reinforcing fibers.

14. The thermoplastic polymer composition as defined by claim 1, said fibrous filler material comprising glass fibers.

15. The thermoplastic polymer composition as defined by claim 1, comprising from 20% to 80% by weight of fibrous filler material, relative to the total weight of the composition.

16. An article shaped from a thermoplastic polymer composition as defined by claim 1.

17. A high shrinkage anisotropy molded article having enhanced tensile strength and shaped from a thermoplastic polymer composition comprising at least one enhanced melt flow polyamide matrix having fibrous filler material distributed therethrough, said fibers being aligned in the same direct at both the surface and core thereof.

18. The molded shaped article as defined by claim 17, having a maximum core thickness of less than or equal to 600 μm.

19. The molded shaped article as defined by claim 17, said fibrous filler material comprising reinforcing fibers.

20. The molded shaped article as defined by claim 17, said fibrous filler material comprising glass fibers.

21. The molded shaped article as defined by claim 17, said fibrous filler material having an average length of from 20 μm to 2 mm.

22. The molded shaped article as defined by claim 17, said fibrous filler material having an average length of from 20 μm to 500 μm.

\* \* \* \* \*